(12) United States Patent
Chisholm et al.

(10) Patent No.: US 6,402,828 B1
(45) Date of Patent: Jun. 11, 2002

(54) AZO LAKE PIGMENT COMPOSITION

(75) Inventors: Greig Chisholm, Newton Mearns; Paul Kerwin, Macclesfield; Mairi Nicol, Stewartfield, all of (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/503,265

(22) Filed: Feb. 14, 2000

(30) Foreign Application Priority Data

Mar. 24, 1999 (GB) ................................ 9906673

(51) Int. Cl.[7] ........................ C09B 67/22; C09B 63/00
(52) U.S. Cl. .................. 106/496; 106/493; 106/494
(58) Field of Search ................... 106/493, 494, 106/496

(56) References Cited

U.S. PATENT DOCUMENTS

| 2,224,574 A | 12/1940 | Martone | 260/197 |
|---|---|---|---|
| 2,229,049 A | 1/1941 | Dahlen et al. | 260/201 |
| 2,508,448 A | 5/1950 | Brizzolara | 260/40 |
| 2,744,027 A | 5/1956 | Struve et al. | 106/289 |
| 6,007,612 A | 12/1999 | Kerwin et al. | 106/31.72 |

FOREIGN PATENT DOCUMENTS

| EP | 0 202 906 | 11/1986 |
|---|---|---|
| EP | 0 259 007 | 3/1988 |

OTHER PUBLICATIONS

Patent abstracts of Japan, vol. 101, No. 148 of JP 61007367 (Jan. 1986).
Patent abstracts of Japan, vol. 015, No. 282 of JP 03 097762 (Apr. 1991).
copy of specification for application No. 09/545,749 (Apr. 2000).
copy of specification for application No. 09/664,812 (Sep. 2000).

*Primary Examiner*—Anthony Green
(74) *Attorney, Agent, or Firm*—David R. Crichton

(57) ABSTRACT

Pigment composition which comprises azo pigments and auxochromes. The composition is prepared in-situ by coupling an aromatic diazonium compound with 3-hydroxy-2-naphthoic acid and can be produced in a fixed quality with excellent reproducibility, transparency, a high color strength, clear and vivid hue and good water resistance.

9 Claims, No Drawings

AZO LAKE PIGMENT COMPOSITION

The invention relates to a pigment composition which comprises azo pigments and auxochromes, a process for the preparation of the composition by coupling an aromatic diazonium compound with 3-hydroxy-2-naphthoic acid, a process for toning an azo lake pigment composition and the use of auxochromes with azo lake pigments.

Azo pigments produced by using 3-hydroxy-2-naphthoic acid as a coupling component are known and particularly useful. For example, they include Pigment Red 57:1 and Pigment Red 48:2. These azo pigments find a diversity of applications and are mainly used to colour printing inks, paints, oil and water colors, plastics and cosmetics. There is a wide range of requirements expected from the pigments used in these applications. For example, a high degree of brilliance and transparency is required for printing inks; durability and hiding power for paints; and heat resistance for plastics. Due to the diversity and extent of these requirements, there is a high demand for pigment compositions which contain known and well-established azo pigments, but permit a wide range of uses according to the intended fields of application.

There is a specific need for improving the toning of azo lake pigment compositions. The term toning, as used in the context of the instant specification, means the control and improvement of properties, such as hue and brilliance.

Brilliance, transparency or hiding power of a pigment composition can be intensified by applying physical methods, such as varying the fineness, form, shape and surface properties of the pigment particles.

The prior art also proposes alternative routes for achieving these goals. It has been recommended to modify the chemical structure of a small amount of pigment in the composition. This can either be achieved by modifying the structure of the 2-hydroxy-3-naphthoic acid. These chemically modified additives present in pigment compositions may be defined as auxochromes. According to EP-A-202 906, the carboxy group in the 2-hydroxy-3-naphthoic acid coupling component is derivatised to an amide or to a substituted amide. According to EP-A-259 007, part of the 2-hydroxy-3-naphthoic acid is replaced with binaphthol.

It is also known to add an auxochrome to azo pigments such as Pigment Red 57:1 in order to obtain shading and depth effects. Auxochromes for Pigment Red 57:1 to obtain blue shading effects have been produced by coupling Tobias acid (2-amino-1-napthalenesulfonic acid) onto 2-hydroxy-3-naphthoic acid. However, the resulting blue shade products still appear "dirty".

Therefore, the object of this invention was to provide azo lake pigment compositions with an improved quality of shading. Preferably, the masstone, particularly for heatset applications, and transparency of the ink in an oil ink system should be improved.

Accordingly, the claimed pigment composition has been found wherein the auxochrome component of the pigment compositions can be prepared by coupling a 2-hydroxy-3-naphthoic acid component with a phenyl amine component, wherein the phenyl group is substituted by at least one $C_1$–$C_4$-alkoxy substituent, particularly methoxy.

The present invention relates to a pigment composition which comprises at least one pigment of the formula:

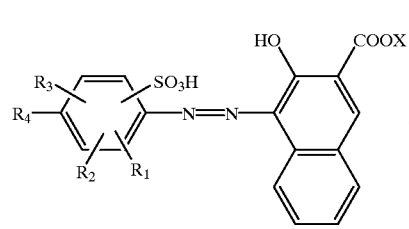

(I)

wherein X represents hydrogen or a cation from a metal selected from calcium, barium, strontium, magnesium, manganese and aluminium, $R_1$, $R_2$ and $R_3$ represent hydrogen or members from the group consisting of $C_1$–$C_4$-alkyl, phenyl, halogen, —$NO_2$ and —$CF_3$, and $R_4$ is as defined as $R_1$, $R_2$ and $R_3$ or represents a group of the partial formula

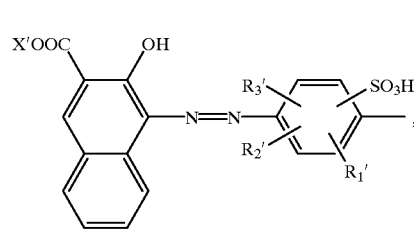

(A)

wherein X' is as defined as X above and $R_1'$, $R_2'$ and $R_3'$ are as defined as $R_1$, $R_2$ and $R_3$ under the formula (I) above, and at least one auxochrome of the formula

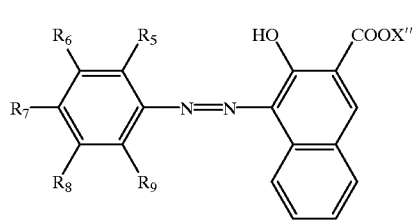

(II)

wherein X" is as defined as X under the formula (I) above, at least one of $R_5$, $R_6$, $R_7$, $R_8$ and $R_9$ represents $C_1$–$C_4$-alkoxy and $R_5$, $R_6$, $R_7$, $R_8$ and $R_9$ independently of one another additionally represent members selected from the group consisting of hydrogen, $C_1$–$C_4$-alkyl, phenyl, halogen, —$SO_3$—H, —$NO_2$ and —$CF_3$ and $R_7$ additionally represents a group of the partial formula

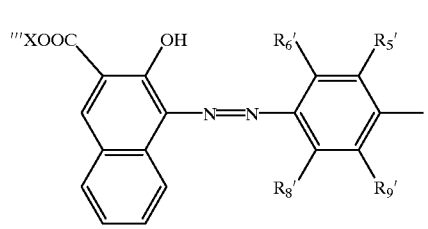

(B)

wherein X''' is as defined as X under the formula (I) above, $R_5$, $R_6$, $R_8$ and $R_9$ are as defined as $R_5$, $R_6$, $R_7$ and $R_8$ under the formula (II) above.

A preferred embodiment of the present invention relates to a composition, which comprises at least one pigment of the formula (I), wherein X represents hydrogen or a cation from a metal selected from calcium, barium, strontium, magnesium, manganese and aluminium and $R_1$, $R_2$, $R_3$ and $R_4$ represent hydrogen or members from the group consisting of $C_1$–$C_4$-alkyl, phenyl, halogen, —$NO_2$ and —$CF_3$, and an auxochrome of the formula (II), wherein X is as defined under the formula (I) above, at least one of $R_5$, $R_6$, $R_7$, $R_8$, and $R_9$ represents $C_1$–$C_4$-alkoxy and $R_5$, $R_6$, $R_7$, $R_8$, and $R_9$ independently of one another additionally represent members selected from the group consisting of hydrogen, $C_1$–$C_4$-alkyl, phenyl, halogen, —$SO_3$—H, —$NO_2$ and —$CF_3$.

A particularly preferred embodiment of the present invention relates to composition, which comprises at least one pigment of the formula

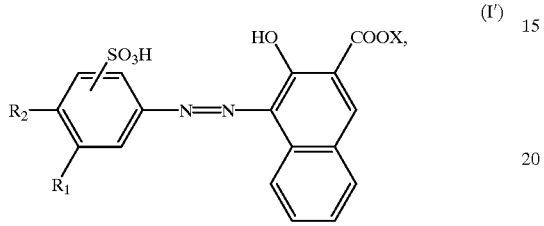

(I')

wherein $R_1$ and $R_2$ are different, $R_1$ represents hydrogen, $C_1$–$C_4$-alkyl or halogen and $R_2$ represents $C_1$–$C_4$-alkyl or halogen and X represents hydrogen or a cation from a metal selected from calcium, barium, strontium, magnesium, manganese and aluminium, and an auxochrome (II).

Particularly preferred is a composition, which comprises a pigment (I'), wherein $R_1$ and $R_2$ are different, $R_1$ represents hydrogen, methyl or chloro and $R_2$ represents methyl or chloro, and an auxochrome (II).

Especially preferred is a composition, which comprises Pigment Red 57:1 and an auxochrome (II) such as an auxochrome obtained by the coupling of ortho-nitro-para-anisidine (ONPA), para-cresidine-orthosulphonic acid (PCOS) or para-nitro-ortho-anisidine (PNOA) with 2-hydroxy-3-naphthoic acid (BONA).

The present invention also relates to compositions comprising preferred auxochromes. In this context a composition is particularly preferred, which comprises at least one pigment (I) and an auxochrome of the formula

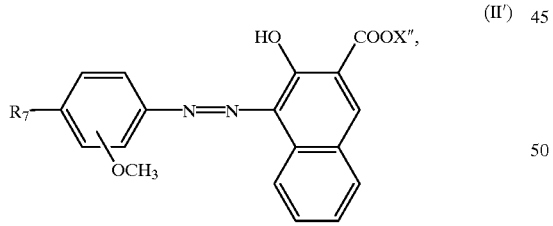

(II')

wherein X" is as defined as X under the formula (I) above and $R_7$ represents hydrogen or —$NO_2$.

In the pigment composition according to the present invention, the amount of auxo-chrome (II) added to the pigment (I) is from about 0.01 to 10.0%, particularly 0.1 to 5.0%, and especially 0.2 to 2.0% by weight based on the weight of the pigment.

The present invention also relates to a composition, which comprises at least one pigment of the formula (I) of above, an auxochrome of the formula (II) of above and the coupling product of 2-napthylamine-1-sulphonic acid (Tobias acid) with the coupling component (V), particularly 2-hydroxy-3-naphthoic acid.

The pigment composition according to the present invention usually is prepared by methods which are known per se, e.g. by diazotising in situ an aromatic amine and coupling the resulting aromatic diazonium compound with 3-hydroxy-2-naphthoic acid.

The present invention also relates to the process for the preparation of the pigment composition, which comprises diazotising at least one amine of the formula

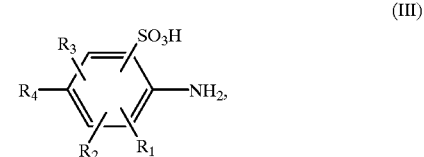

(III)

wherein $R_1$, $R_2$ and $R_3$ are as defined above and $R_4$ is as defined as $R_1$, $R_2$ and $R_3$ or represents a group of the partial formula

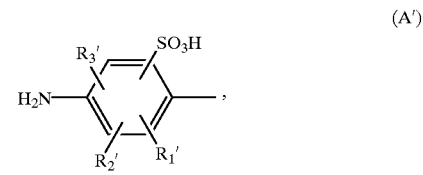

(A')

wherein $R_1$, $R_2$ and $R_3$ are as defined as $R_1$, $R_2$ and $R_3$ above; and at least one amine of the formula

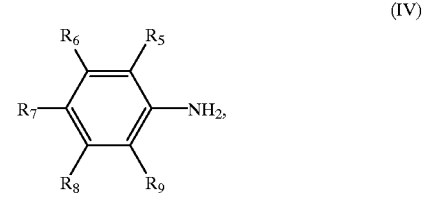

(IV)

wherein at least one of $R_5$, $R_6$, $R_7$, $R_8$, and $R_9$ represents $C_1$–$C_4$-alkoxy and $R_5$, $R_6$, $R_7$, $R_8$, and $R_9$ are as defined above and $R_7$ additionally represents a group of the partial formula

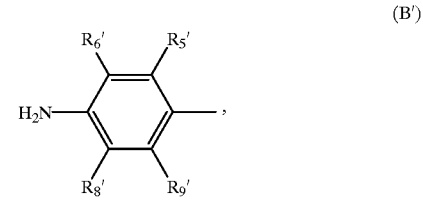

(B')

wherein $R_5'$, $R_6'$, $R_8'$ and $R_9'$ are as defined above, and coupling the diazotised amines (III) and (IV) with a coupling component of the formula

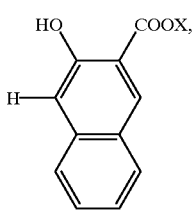

(V)

wherein X is as defined above under formula (I).

The process for preparing the pigment composition can be carried out in a customary way and is not particularly restricted. For example the mixture of amines (III) and (IV) preferably is diazotised at −10 to 10° C. to prepare the diazo component. The coupling component (V) usually is dissolved in an aqueous solution of sodium hydroxide to prepare the solution of the coupling component. As a rule the diazo component is added dropwise to the aqueous solution containing the coupling component to perform the coupling reaction at a temperature of generally −5 to 50° C., preferably −2 to 20° C. The resulting slurry may then be laked with an aqueous salt solution containing metal salts selected from calcium, barium, strontium, magnesium, manganese and aluminium salts or mixtures thereof.

In a preferred embodiment of the process, auxochromes are prepared by diazotising 2- or 4-nitro para anisidine, ortho anisidine-5-sulphonic acid, or para cresidine ortho sulphonic acid and coupling with 3-hydroxy-2-naphthoic acid.

In the event that an amine (III) is diazotised which is substituted in para-position by the group of the formula A', a diazo pigment of the formula

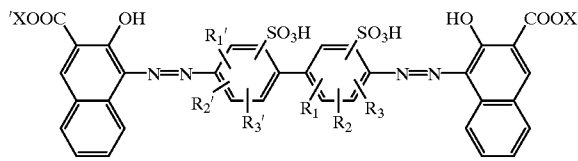

derived from 4,4'-diamino-substituted biphenyl is obtained, wherein the various substituents are as defined above. In the event that an amine (IV) is diazotised, which is substituted in para-position by the group of the formula B', a diazo auxochrome derived from 4,4'-diamino substituted biphenyl is obtained. The present invention also relates to pigment mixtures containing diazo-pigments and diazo-auxochromes, which are both derived from diazotised 4,4'-diamino-substituted biphenyls.

If required, the resulting slurry or wet cake of the azo pigment lake may be further processed by treating with an anionic surfactant, such as a fatty acid, a dialkyl sulfosuccinate or resin ester or rosin, or a metal salt, e.g. calcium salt thereof, or with a cationic surfactant, e.g. aliphatic, primary, secondary or tertiary amines, aliphatic diamines or an alkyl quaternary ammonium chloride, or with various known non-ionic surfactants. Usually the amout of surfactants is chosen in the range of from 0 to 50%, preferably from 2 to 35%, most preferably from 5 to 25% by weight, based on the amount of compound I.

The azo lake pigment slurry obtained may then be filtered and washed with water. To improve the dispersibility of the pigments and retain their transparency, the particles may be "aged" by stirring the slurry at elevated temperatures, particularly at 70 to 95° C. for about 30 minutes up to 3 hours. In a preferred embodiment of the process the composition is further processed to a granular or powder form.

The wet cake of the pigments obtained may be flushed and kneaded directly into a varnish for inks or a resin for paints to prepare a so-called base colour. In a preferred embodiment of the process the wet cake of the composition is further processed to a granular or powder form.

The invention also relates to the process of toning an azo lake pigment composition, which comprises doping the above-mentioned azo lake pigment (I) with an auxochrome (II). The toning may be effected by mixing the azo lake pigment (I) with the auxochrome (II).

The present invention also relates to the use of an auxochrome (II) for toning any azo lake pigments. The invention particularly relates to the use of an auxochrome (II) for toning azo lake pigments (I) as defined above.

The pigment composition according to the present invention can be produced in a fixed quality with excellent reproducibility, and has excellent transparency, a high color strength and a clear and vivid hue.

The combination of the anisidine-based auxochromes (II) mentioned above with Tobias acid coupled onto 2-hydroxy-3-naphthoic acid gives unexpected synergistic improvements in shade, depth and colour strength. The extent of these advantages are unpredictable from additive effects of the auxochrome (II) and the coupling product of 2-napthylamine-1-sulphonic acid (Tobias acid) with the coupling component (V), particularly 2-hydroxy-3-naphthoic acid, in compositions containing pigments of the formula (I).

The following examples illustrate the invention without limiting its scope:

EXAMPLES

Example 1

(Comparative Example)

35.9 g of 4-aminotoluene-3-sulphonic acid (98.2%) are dissolved in 265 ml of water using 16.2 g of 47% sodium hydroxide solution with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) are added to the suspension before the volume of the suspension is adjusted to 800 ml at 0 to 5°C.

19.0 g of modified abietic acid rosin (Burez® S3075 as supplied by EKA Nobel) are dissolved in 480 ml of water with 5.2 g of sodium hydroxide solution (as above) by heating to 80° C. with stirring. Once a resin solution is obtained, the solution is cooled to 50° C. by addition of 250 ml of water. 30 g of sodium hydroxide solution (47%) and 35.5 g of 2-hydroxy-3-naphthoic acid (BONA) are added with stirring. The volume of the solution is adjusted to 800 ml at 0 to 5° C. by ice addition.

To a vessel containing 800 ml of water at 5° C., the diazo component and the resin/BONA solution are added simultaneously over a period of 48 minutes with stirring and maintaining the temperature at 5 to 60° C. and a pH of 10.8 to 11.0.

After the coupling is complete, the suspension is stirred for a further 15 minutes at the above conditions. The pH of the slurry is then adjusted to 7.0 using dilute hydrochloric acid (ca. 10%) before steam heating to 80° C. The suspension is then cooled to 60° C. by addition of cold water and filtered and washed salt free. The product is then dried overnight at 90° C. before grinding to a powder.

Example 2

(Comparative Example)

34.7 g of 4-aminotoluene-3-sulphonic acid (98.2%) and 1.2 g of 2-naphthyl-amine-1-sulphonic acid (Tobias acid) are dissolved in 265 ml of water using 16.2 g of 47% sodium hydroxide solution with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 1.

Example 3

34.7 g of 4-aminotoluene-3-sulphonic acid (98.2%) and 1.2 g of para-nitro-orthoanisidine (PNOA) are dissolved in 265 ml of water using 16.2 g of 47% sodium hydroxide solution with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 1.

Example 4

(Comparative Example)

34.7 g of 4-aminotoluene-3-sulphonic acid (98.2%) and 1.2 g of 2-naphthyl-amine-1-sulphonic acid (Tobias acid) are dissolved in 265 ml of water using 16.2 g of 47% sodium hydroxide solution with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

9.5 g of modified abietic acid rosin (Burez® S3075 as supplied by EKA Nobel) are dissolved in 240 ml of water with 2.6 g of sodium hydroxide liquor (47%) by heating to 80° C. with stirring. Once a resin solution is obtained, the solution is cooled to 50° C. by addition of 125 ml of water. 30 g of sodium hydroxide liquor (47%) and 35.5 g of 2-hydroxy-3-naphthoic acid (BONA) are added with stirring. 19 g of a 50% w/w resin ester dispersion known as Snowtack® 380A (as supplied by EKA Nobel) are added to the solution. The volume of the suspension is adjusted to 800 ml at 0 to 5° C. by ice addition.

The process is completed according to example 1.

Example 5

34.7 g of 4-aminotoluene-3-sulphonic acid (98.2%), 0.4 g of 2-naphthylamine-1-sulphonic acid (Tobias acid) and 0.8 g of para-cresidine-orthosulphonic acid (PCOS) are dissolved in 265 ml of water using 16.2 g of 47% sodium hydroxide liquor with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 4.

Example 6

(Comparative Example)

43.0 g of 2-amino-4-chloro-5-methylbenzenesulphonic acid are dissolved in 265 ml of water using 16.2 g of 47% sodium hydroxide liquor with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 1.

Example 7

(Comparative Example)

41.4 g of 2-amino-4-chloro-5-methylbenzenesulphonic acid and 1.2 g of 2-naphthylamine-1-sulphonic acid (Tobias acid) are dissolved in 265 ml of water using 16.2 g of 47% sodium hydroxide solution with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 1.

Example 8

41.4 g of 2-amino-4-chloro-5-methylbenzenesulphonic acid and 1.2 g of ortho-nitro-para-anisidine (ONPA) are dissolved in 265 ml of water using 16.2 g of 47% sodium hydroxide liquor with stirring. The temperature of the solution is reduced to 2° C. by ice addition before adding 12.2 g of sodium nitrite which has previously been dissolved in 50 ml of water. 48 ml of concentrated hydrochloric acid (35%) is added to the solution with stirring to form the diazo salt. Stirring is continued for 20 minutes while maintaining a temperature of 0 to 5° C. by addition of ice. 33.2 g of calcium chloride (80%) is added to the suspension before the volume of the suspension is adjusted to 800 ml at 0 to 5° C.

The process is completed according to example 1.

Example 9

20 g of the finished pigment powders (Examples 1–8) are incorporated into 80 g of an ink varnish consisting of 1 part distillate (PKWF 4/7 New supplied by Halterman), 4 parts resin (known as Sparkle 609 supplied by Lawter International) and 6 parts gelled hard resin (known as Luminex 11 supplied by Lawter International). Mixing is performed on the back rolls of a Buhler SDY-200 three roll mill at 23° C. and 10 bar pressure for 5 minutes . The mixtures are then given 2×10 bar passes over the three roll mill at 23° C .

Masstone and transparency are assessed by visually assessing the inks.

| Pigment used to prepare ink | Masstone of ink | Transparency of ink |
| --- | --- | --- |
| Example 1 (comparative) | std. | std. |
| Example 2 (comparative) | 5 deep | 1 TR |
| Example 3 | 7 deep | 2 TR |
| Example 4 (comparative) | std. | std. |
| Example 5 | 4 deep | 1 TR |
| Example 6 (comparative) | std. | std. |
| Example 7 (comparative) | 6 deep | 1 TR |
| Example 8 | 7 deep | 1 TR |

(std. means "standard"; "deep" means the degree of the masstone (in contrast to "pale", wherein the higher the number the deeper the masstone; "TR" stands for transparency, the higher the number the more transparent the ink compared to the used standards)

What is claimed is:

1. A pigment composition which comprises a) at least one pigment of the formula:

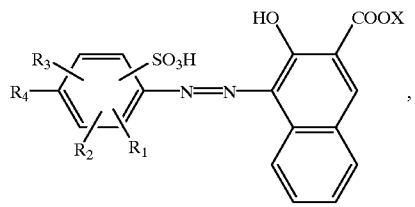

(I)

wherein X represents hydrogen or a cation from a metal selected from the group consisting of calcium, barium, strontium, magnesium, manganese and aluminum, $R_1$, $R_2$ and $R_3$ represent hydrogen or members selected from the group consisting of $C_1$–$C_4$-alkyl, phenyl, —$NO_2$ and —$CF_3$, and $R_4$ is as defined as $R_1$, $R_2$ and $R_3$ or represents a group of the formula

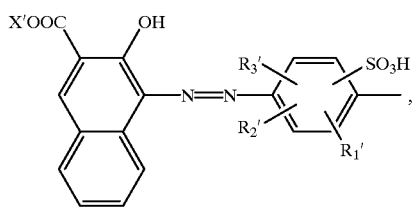

(A)

wherein X' is as defined as X above and $R_1'$, $R_2'$ and $R_3'$ are as defined as $R_1$, $R_2$ and $R_3$ under the formula (I) above, and b) an effective shading amount of at least one auxochrome of the formula

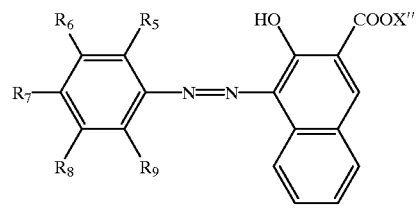

(II)

wherein X" is as defined as X under the formula (I) above, at least one of $R_5$, $R_6$, $R_7$, $R_8$ and $R_9$ represents $C_1$–$C_4$-alkoxy and $R_5$, $R_6$, $R_7$, $R_8$ and $R_9$ independently of one another additionally represent members selected from the group consisting of hydrogen, $C_1$–$C_4$-alkyl, phenyl, halogen, —$SO_3$—H, —$NO_2$ and —$CF_3$ and $R_7$ additionally represents a group of the formula

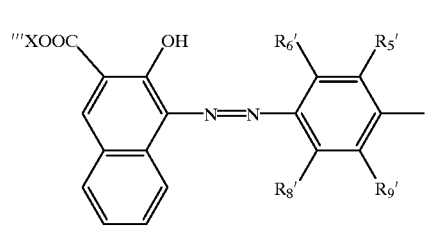

(B)

wherein X''' is as defined as X under the formula (I) above, $R_5'$, $R_6'$, $R_8'$ and $R_9'$ are as defined as $R_5$, $R_6$, $R_7$ and $R_8$ under the formula (II) above, with the proviso, that (a) if only one of $R_5$, $R_6$, $R_7$, $R_8$ and $R_9$ stands for $C_1$–$C_4$-alkoxy and (b) if one additional member of $R_5$, $R_6$, $R_7$, $R_8$ and $R_9$ (less the one which stands for $C_1$–$C_4$-alkoxy) stands for —COOH or —$SO_3$H, then no other member of $R_5$, $R_6$, $R_7$, $R_8$ and $R_9$ (less the ones which stand for $C_1$–$C_4$-alkoxy and —COOH respectively —$SO_3$H) stands for methyl or hydrogen.

2. A composition according to claim 1 which comprises at least one pigment of the formula (I), wherein X represents hydrogen or a cation from a metal selected from the group consisting of calcium, barium, strontium, magnesium, manganese and aluminum and $R_1$, $R_2$, $R_3$ and $R_4$ represent hydrogen or members from the group consisting of $C_1$–$C_4$-alkyl, phenyl, —$NO_2$ and —$CF_3$, and an auxochrome of the formula (II), wherein X" is as defined as X under the formula (I) above, at least one of $R_5$, $R_6$, $R_7$, $R_8$, and $R_9$ represents $C_1$–$C_4$-alkoxy and $R_5$, $R_6$, $R_7$, $R_8$ and $R_9$ independently of one another additionally represent members selected from the group consisting of hydrogen, $C_1$–$C_4$-alkyl, phenyl, halogen, —$SO_3$H, —$NO_2$ and —$CF_3$.

3. A composition according to claim 1 which comprises at least one pigment of the formula

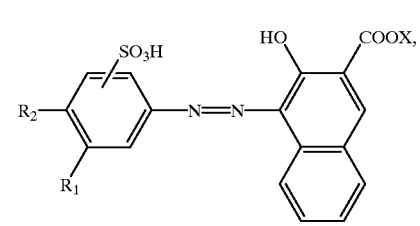

(I')

wherein $R_1$ and $R_2$ are different, $R_1$ represents hydrogen, or $C_1$–$C_4$-alkyl and $R_2$ represents $C_1$–$C_4$-alkyl and X represents hydrogen or a cation from a metal selected from the group consisting of calcium, barium, strontium, magnesium, manganese and aluminum, and an auxochrome (II).

4. A composition according to claim 1, which comprises at least one pigment (I) and an auxochrome of the formula

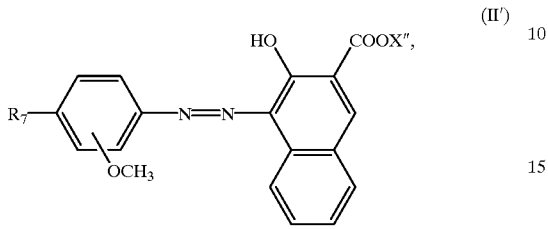
(II′)

wherein X" is as defined as X under the formula (I) and $R_7$ represents hydrogen or —$NO_2$.

5. A composition according to claim 1, which comprises at least one pigment (I) and an auxochrome (II), wherein the amount of auxochrome added to the pigment is from 0.01 to 10.0% by weight based on the weight of the pigment.

6. A composition according to claim 1, which comprises at least one pigment of the formula (I), an auxochrome of the formula (II) and the coupling product of 2-napthylamine-1-sulphonic acid (Tobias acid) with 2-hydroxy-3-naphthoic acid.

7. A process for preparing a composition according to claim 1, which comprises diazotising at least one amine of the formula

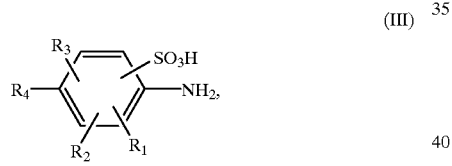
(III)

wherein $R_4$ is as defined as $R_1$, $R_2$ and $R_3$ or represents a group of the formula

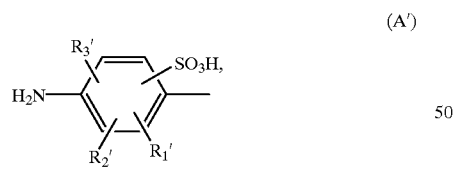
(A′)

wherein $R_1'$, $R_2'$ and $R_3'$ are as defined as $R_1$, $R_2$ and $R_3$; and at least one amine of the formula

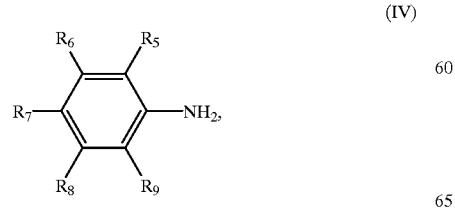
(IV)

wherein at least one of $R_5$, $R_6$, $R_7$, $R_8$, and $R_9$ represents $C_1$–$C_4$-alkoxy and $R_7$ additionally represents a group of the formula

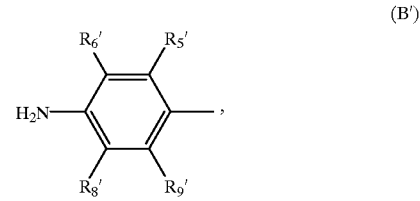
(B′)

with the proviso, that (a) if only one of $R_5$, $R_6$, $R_7$, $R_8$ and $R_9$ stands for $C_1$–$C_4$-alkoxy and (b) if one additional member of $R_5$, $R_6$, $R_7$, $R_8$ and $R_9$ (less the one which stands for $C_1$–$C_4$-alkoxy) stands for —COOH or —$SO_3H$, then no other member of $R_5$, $R_6$, $R_7$, $R_8$ and $R_9$ (less the ones which stand for $C_1$–$C_4$-alkoxy and —COOH respectively —$SO_3H$) stands for methyl or hydrogen, and coupling the diazotised amines (III) and (IV) with a coupling component of the formula

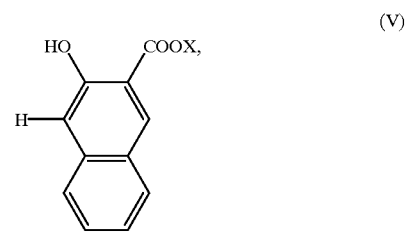
(V)

wherein X is as defined above under formula (I).

8. A process according to claim 7, which comprises further processing the composition to a granular or powder form.

9. A process of toning an azo lake pigment composition, which comprising doping the azo lake pigment with an auxochrome (II)

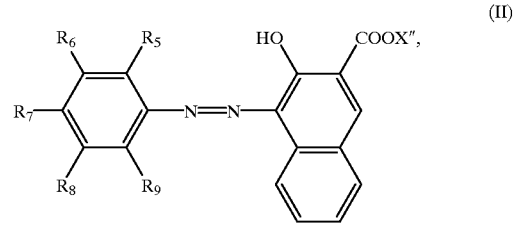
(II)

wherein X" represents hydrogen or a cation from a metal selected from the group consisting of calcium, barium, strontium, magnesium, manganese and aluminum, at least one of $R_5$, $R_6$, $R_7$, $R_8$ and $R_9$ represents $C_1$–$C_4$-alkoxy and $R_5$, $R_6$, $R_7$, $R_8$ and $R_9$ independently of one another additionally represent members selected from the group consisting of hydrogen, $C_1$–$C_4$-alkyl, phenyl, halogen, —$SO_3$—H, —$NO_2$ and —$CF_3$ and $R_7$ additionally represents a group of the partial formula (B) 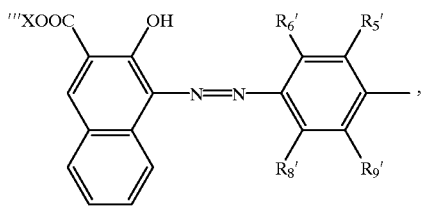

wherein X''' represents hydrogen or a cation from a metal selected from the group consisting of calcium, barium, strontium, magnesium, manganese and aluminum, $R_5'$, $R_6'$, $R_8'$ and $R_9'$ are as defined as $R_5$, $R_6$, $R_7$ and $R_8$ under the formula (II) above, with the proviso, that (a) if only one of $R_5$, $R_6$, $R_7$, $R_8$ and $R_9$ stands for $C_1$–$C_4$-alkoxy and (b) if one additional member of $R_5$, $R_6$, $R_7$, $R_8$ and $R_9$ (less the one which stands for $C_1$–$C_4$-alkoxy) stands for —COOH or —SO$_3$H, then no other member of $R_5$, $R_6$, $R_7$, $R_8$ and $R_9$ (less the ones which stand for $C_1$–$C_4$-alkoxy and —COOH respectively —SO$_3$H) stands for methyl or hydrogen.

* * * * *